United States Patent [19]

Laroche et al.

[11] Patent Number: 5,264,227
[45] Date of Patent: Nov. 23, 1993

[54] FEED SUPPLEMENTS FOR RUMINANT ANIMALS

[75] Inventors: Jean-Luc Laroche; Simon Baillargeon, both of Montreal, Canada

[73] Assignee: Cooperative Federee de Quebec, Montreal, Canada

[21] Appl. No.: 849,153

[22] Filed: Mar. 10, 1992

[51] Int. Cl.⁵ .................... A23K 1/02; A23K 1/175
[52] U.S. Cl. ................................. 426/72; 426/2; 426/74; 426/512; 426/807
[58] Field of Search .............. 426/2, 72, 512, 807, 426/74

[56] References Cited

U.S. PATENT DOCUMENTS

| | | | |
|---|---|---|---|
| 3,246,336 | 4/1966 | Baribo et al. | 426/2 |
| 3,669,676 | 6/1972 | Karr . | |
| 4,061,728 | 12/1977 | Graham et al. | 424/14 |
| 4,171,385 | 10/1979 | Skoch et al. | 426/658 |
| 4,234,608 | 11/1980 | Linchan | 426/72 |
| 4,729,896 | 3/1988 | Sawhill | 426/2 |
| 4,888,185 | 12/1989 | Miller | 426/72 |
| 4,994,284 | 2/1991 | Miller | 426/74 |

FOREIGN PATENT DOCUMENTS

| | | |
|---|---|---|
| 1046337 | 1/1970 | Canada . |
| 919980 | 1/1973 | Canada . |
| 928134 | 6/1973 | Canada . |
| 1009496 | 5/1977 | Canada . |
| 1009497 | 5/1977 | Canada . |
| 1023604 | 1/1978 | Canada . |
| 1058001 | 7/1979 | Canada . |
| 1090649 | 12/1980 | Canada . |
| 1116926 | 1/1982 | Canada . |
| 1119877 | 3/1982 | Canada . |
| 1119878 | 3/1982 | Canada . |
| 1120308 | 3/1982 | Canada . |
| 1121647 | 4/1982 | Canada . |
| 1126568 | 6/1982 | Canada . |
| 1146007 | 5/1983 | Canada . |
| 221348 | 4/1985 | German Democratic Rep. . |
| 2191379A | 12/1987 | United Kingdom . |

OTHER PUBLICATIONS

Jimenez "Sodium Sesquicarbonate's effectiveness as an alkalizer" Feedstuffs Jan. 28, 1985 pp. 10–11.
Jimenez-'New poured block formulation influences buffer intake' Feedstuffs, Aug. 25, 1986.
Downer & Cummings-'Sodium Bicarbonate: a ten year review of lactation studies' JDS-vol. 70-Suppl. 1 (Jun. 1987).
Allenstein D. V. M.-Veterinary Column-Hoard's Dairyman, Nov. 1991.
Brochure by Church & Dwight Co., Inc.-'Cow Brand Sodium Bicarbonate . . . ' 1982.
Miller et al.-'Effects of Ingested Soil on Ration Utilization by Dairy Cows'-p. 618.
Brochure by Church & Dwight Co., Inc.-'Usage of Sodium Bicarbonate in Cattle Feeding'-pp. 1–34.
Can. J. Anim. Sci. 65: 521–523 (Jun. 1985) 'Effect of Abruptly Adding Buffers to the Rations of Lactating Dairy Cows'.
Lane-'Both "Bicard" and Sesquicarb are Effective Buffers' Hoard's Dairyman, Nov. 25, 1985.
Encyclopedia of Chemical Technology, Index vol. 21–"Steffan Process" pp. 516–517, 542–543, 868–869, 908–909, 915–917, 1081.
Block & Muller-'Effect of Adding Buffers to the Rations . . . ' Research Reports Macdonald College, Jan. 1985, pp. 17–21.
Brochure citing Journal of Dairy Science 1975-1985-- Arm & Hammer Erdman-'Potential New Uses for Buffers . . . ' pp. 48–53.
Erdman et al.-'Dietary Sodium Bicarbonate . . . ' Journal of Dairy Science, vol. 65, May 1982.
St. Laurent & Block-'Evaluation of Methods & Effects of Feeding Sodium Bicarbonate . . . ' Research Reports-Macdonald College. Jan. 1985, pp. 10–16.
Hutjens "Questions & Answers"-Dairy Herd Management.
Erdman et al. -Reference in Animal Nutrition & Health, May-Jun. 1983.
Kling et al. "Antioxidant Protection by Vitamin E and Synthetic Antioxidants During Heavy Metal Stress"-p. 55.
Erdman et al. "Effects of Sodium Bicarbonate on Palatability and Voluntary Intake . . . "-Journal of Dairy Science, vol. 65, May 1982.

Primary Examiner—Jeanette Hunter
Assistant Examiner—Mary S. Mims
Attorney, Agent, or Firm—Edwin J. Gale

[57] ABSTRACT

Feed supplements for ruminant animals particularly buffer blocks for dairy cattle. The buffer block is prepared by forming a mixture containing at least about 60% by weight of buffer materials other than magnesium oxide (preferably sodium bicarbonate and/or sodium sesquicarbonate), at least about 20% by weight of magnesium oxide, and no more than about 16% by weight of a sugar-containing binder (e.g. molasses), and then shaping and compressing the mixture at a pressure of at least about 2800 pounds per square inch (19,306 kPa) for at least 8 seconds. The resulting block is acceptable to the animals despite its large content of buffer ingredients and has suitable physical and chemical properties for use as a free choice feed supplement block despite the simple and economical preparation process.

22 Claims, No Drawings

FEED SUPPLEMENTS FOR RUMINANT ANIMALS

BACKGROUND OF THE INVENTION

I. Field of the Invention

This invention relates to feed supplements for ruminant animals and, more particularly, to buffers used for dairy cattle and other bovines.

II. Description of the Prior Art

It is well known that the milk yields, dry matter consumption and the health of lactating dairy cows suffer when the animals are fed acidotic rations (e.g. high starch rations) over a period of time. These rations, which contain a high level of concentrate (grains, supplements, etc.) and low fiber, reduce the secretion of saliva and the rumen liquor pH that is normally at almost the neutral level (6.0–6.5).

The variation of the rumen pH is principally attributable to increased ruminal fermentation leading to the production of organic acids (acetic acid, butyric acid, propionic acid, etc.). Moreover, the highly concentrated diet reduces the chewing and mastication time, thus reducing the production of alkaline saliva which normally assists in stabilizing the rumen pH since it contains natural buffers like bicarbonates.

The ruminal pH may be brought back to the natural level by feeding an alkaline material, such as sodium carbonate, sodium bicarbonate or sodium sesquicarbonate, to the animals and, when this is done, milk yields return to normal. It has been found to be particularly beneficial to combine one or more of these ingredients with magnesium oxide to prevent milk and fat depression attributable to a high concentrate ration.

Unfortunately, in order to affect rumen pH sufficiently, quite large amounts of alkaline materials of these kinds must be fed to the animals. For example, a cow having a high level of milk production can produce the equivalent of one to two kilograms of sodium bicarbonate in her saliva each day, which illustrates the type of quantities involved. Even though, in practice, such large quantities do not have to be served to the animals, even smaller amounts such as 300 to 400 grams of buffers are unappealing to the animals, particularly when magnesium oxide is present because this material seems to be particularly unpalatable to cattle. If attempts are made to make cattle "swallow" great quantities of magnesium oxide and buffers in this way, the animals usually refuse to eat the mineral and accompanying feedstuffs. Consequently, if the buffers are mixed with the regular feedstuffs, there may be a reduction in the consumption the feed, which can lead to obvious problems, and the animals may have difficulty adapting to the treated feedstuffs.

In order to overcome this problem, attempts have been made to make the buffer ingredients more appealing to the animals by pelletizing the ingredients with molasses, corn, by-products and flavors. Nevertheless, the animals almost have to be "force fed" to get them to accept the buffers in significant amounts. Even if the products are made to have an appealing smell, they still obviously retain an unacceptable taste for the animals. The buffers treated in this way are normally offered "top-dressed" on the ration or mixed in the concentrate and delivered in controlled quantities. Consequently, if the animals do not eat the buffers, they do not eat their normal ration.

Sometimes the buffers are offered on a free choice basis, e.g. loose in an auger or manger. However, because the buffers are unpalatable to a greater or lesser extent depending on individual preferences, many animals do not consume the required amounts. Moreover, since the buffers are highly hygroscopic, animal saliva and ambient humidity cause caking and the formation of clods, thus making the buffers unpalatable and unusable, and resulting in unacceptable losses of useful material.

It would therefore be highly desirable to produce a palatable free-choice block containing buffers as a convenient way to supply adequate amounts of these elements to dairy cattle or other bovines in order to prevent or alleviate acidosis attributable to high energy, low fiber diets or diets containing humid and fermented acid feeds. The advantage of free-choice blocks is that the blocks cause the buffering ingredients to dissolve on the animals' tongues, stimulating salivation and thus producing a double antacid effect: firstly by delivering the buffering agents, and secondly by promoting secretion of saliva, which itself contains natural buffers. Since the buffer blocks are offered free-choice, they are not force-fed to the animals, so there is no negative impact on the consumption of the feed rations. Moreover, when the buffers are presented in block form, the ingredients are consumed over a long period of time, allowing the buffers to stabilize the rumen pH all day long.

Furthermore, in solid block form, the problem of caking of powdered ingredients is avoided and the buffer is easier to use. Overconsumption of buffers is also prevented by self-regulation by the animals, based on the homeostatic system to maintain the blood pH and the whole system in a neutral environment and to maintain the acid-base balance. For example, an animal having a severe deficiency of sodium can experience an intense craving for salt and can manifest pica by licking and chewing various objects. The same is believed to be true of buffers, since animals experiencing severe deficiencies of buffers will tend to ingest soil containing grit as a physical conditioner. Since such severe deficiencies will lower the productivity of the animal, it is better to prevent this condition and to provide the necessary buffers in the form of a palatable block that will result in free-choice consumption of the proper amounts of buffer.

One way of producing such blocks is by the so-called poured block technique. Poured blocks are usually formed by mixing the buffer ingredients, and other materials such as vitamins, minerals and flavors, etc., with liquid ingredients such as molasses, pouring the resulting slurry or paste into a mold and then either heating the mixture to remove excess water or allowing it to dry or gel and harden over time.

A method of forming free choice buffer blocks is disclosed, for example, in U.S. Pat. No. 4,729,896 to Sawhill issued Mar.8, 1988. This is a typical example of the gelled or poured block technique in which feed solution, e.g. molasses in the form of a thin or thick syrup, in an amount of 30-95% by weight of the final mixture, is solidified or gelled by the addition of sodium carbonate/bicarbonate (8-25% by weight) and magnesium oxide (2-5% by weight). However, the resulting blocks contain a large proportion of molasses or other sugar solution and only small proportions of the buffer ingredients.

Canadian patent 1,126,568 to Skoch issued Jan. 29, 1982 also discloses a block containing a large amount (18-74% by weight) of molasses formed by molding and solidifying a liquid mixture.

Since these buffer blocks contain only relatively small amounts of buffer equivalent (e.g. 16% by weight in the case of the preferred Sawhill blocks), animals have to ingest large quantities of the block. To obtain the equivalent of 200 grams of bicarbonate/carbonate by day, animals will have to consume 1.25 kg of these blocks, which is a large amount for a block offered on a free choice basis and thus the blocks may not be able to deliver sufficient amounts of the buffers.

Poured or gelled blocks also suffer from the disadvantages that the method of preparation is slow and uneconomical and that the blocks are rather soft, but dry out over time and tend to crack.

OBJECTS OF THE INVENTION

It is therefore an object of the present invention to provide a buffer block by a novel method, which block remains stable over a period of time without undue hardening or cracking or other problems when exposed to the elements.

Another object of the invention is provide a buffer block which is relatively palatable to the animals.

Another object of the invention is to provide a buffer block which is capable of delivering large quantities of buffering ingredients to animals when presented on a free choice basis.

Another object of the invention is to provide a process for producing buffer blocks in a rapid and economical manner.

SUMMARY OF THE INVENTION

The present invention is based on the unexpected finding that a relatively palatable buffer block can be formed after sufficient conditioning, by adequate compression of a specific mixture containing a large proportion of the buffer ingredients and a small proportion of a sugar-containing binder.

The resulting block not only has the advantage of containing a large proportion of the buffer ingredients, and thus of making these ingredients available in suitable quantities for consumption by the animals, but also has the advantage of being physically and chemically stable over time both when stored and when exposed to the elements during use.

The block also has optimal hardness, in that it is sufficiently hard to be physically and chemically stable, but not so hard that delivery of large quantities of buffer ingredients to the animals over a limited period of time is prevented.

More particularly, according to the invention, there is provided a process for producing a buffer block for ruminant animals, which comprises forming a mixture containing at least about 60% by weight of at least one solid buffer material other than magnesium oxide, at least about 20% by weight of magnesium oxide, and no more than about 16% by weight of a sugar-containing binder (e.g. molasses), and shaping and compressing the mixture at a pressure of at least about 2800 pounds per square inch for at least about 8 seconds to form a solid block.

According to another aspect of the invention, there is provided a buffer block for ruminant animals produced by the above process.

The invention makes it possible to produce, in an economical and rapid manner, palatable solid buffer blocks of suitable physical properties having high contents of buffer ingredients.

It is surprisingly found that animals are willing to consume such blocks on a free choice basis in relatively large amounts (up to 500 g/head/day), even though the blocks contain large proportions of unpalatable ingredients (including magnesium oxide), without any adaptation period or other negative effects. The normal intake of the solid is in the region of 100 to 200 grams per head per day.

DETAILED DESCRIPTION OF THE PREFERRED EMBODIMENTS

While blocks containing buffers (including magnesium oxide) and molasses have been produced in the past, the total concentration of buffers in such blocks has been much lower and the fabrication procedure has involved wet molding techniques (poured or gelled block procedures) with the attendant disadvantages mentioned above.

The process of the present invention makes it possible not only to increase the proportion of buffer ingredients but also to produce the block by a rapid compression molding technique. This is possible, even though it is surprising that a "dry" mixture containing such a small proportion of a binder and liquid ingredients and a high proportion of solid buffer ingredients can be formed into a stable solid block by compression.

The block produced according to this invention contains magnesium oxide and one or more other solid buffer materials. Examples of the other buffer material include, for example, potassium chloride, potassium carbonate and potassium bicarbonate. However, these materials are relatively expensive and it is much more preferable to use sodium carbonate, sodium bicarbonate, sodium sesquicarbonate or mixtures thereof. It is, in fact, most preferable to use a mixture of sodium bicarbonate and sodium sesquicarbonate containing at least 1% of sodium bicarbonate and at least 1% of sodium sesquicarbonate. That is to say, the mixture may contain as much to 59% of sodium bicarbonate and as little as 1% of sodium sesquicarbonate, or alternatively as much as 59% of sodium sesquicarbonate and as little as 1% of sodium bicarbonate. Together these compounds add up to the required 60% by weight or more. Standard commercial grades of these compounds are generally employed, e.g. as obtained from Church & Dwight, USA.

The magnesium oxide used in the invention may be any available kind, e.g. a standard commercial grade product. It is usually present in the minimum required amount of about 20% by weight, although more may be employed, if desired.

The block contains less than about 16% by weight of a sugar-containing binder. The sugar containing binder is preferably a concentrated or viscous liquid containing at least about 45% by weight of sugars and up to about 25% by weight of water. However, at least part of the sugar-containing binder may be in the form of a solid sugar-containing mixture. Molasses is the preferred sugar-containing binder, but liquid whey and other waste sugar solutions or mixtures could be used, if desired. When molasses is used as the binder, it is preferably to use a combination of dry molasses and liquid molasses. These products are well known in the industry. Liquid molasses is a product containing about 25% by weight of water. More precisely, liquid molasses from sugar cane generally comprises, by weight, 48-56% of sugars, 9-12% of non-sugar organic matter, about 25% water and 10-12% inorganic material (sulfated ash). The sugar content is generally 30-40% sucrose, 15-20% invert sugar, and 2-4% unfermentable sugars. Liquid molasses from sugar beet contains similar ingredients. Liquid molasses of various kinds is available commercially from numerous sources.

Dry molasses is a dehydrated liquid molasses generally containing about 5% by weight of water. A suitable product can be obtained from Westway Trading Corporation, Canada.

Lignosulfonate is also preferably used as an additional binder in the mixture of the present invention in order to complement the effect of the sugars in making the ingredients bind together to the required extent. This ingredient is a by-product of the paper mill industry. It is a soluble derivative from lignin, constituting 20 to 35% by weight of dry wood. Lignosulfonate contains gums, sugars and other agents which, when humidified, act as a binder or glue for the other ingredients. The material is generally available in dry form, but may also be available in liquid form. Both the dry form and the liquid form have suitable binding properties.

A small amount of animal vegetable feeding fat of any suitable type is also preferably used in the mixture to make the resulting buffer block more waterproof and consequently better able to resist swelling or dissolution by rain without making the ingredients insoluble when licked by the animals. Animal vegetable feeding fat is a commercial product readily available to animal feed producers.

Standard vitamins are also preferably added to the mixture in order to improve the nutritional effect of the block. For example, a mixture of Vitamin A, Vitamin D-3 and Vitamin E may be used.

It should be noted that the liquid contents in the buffer block mixture, e.g. the total of the sugar-containing binder, if present as an aqueous solution, and the animal vegetable feeding fat, should preferably amount to at least 4% by weight of the total mixture in order to ensure proper binding and humidification. It is found that if the amount of the liquid ingredients is too high (e.g. more than about 18% by weight), a soft, dripping wet block is formed. On the other hand, if the amount of the liquid ingredients is too low (e.g. less than 4% by weight), the ingredients may not stick together properly. In fact, the mixture normally contains at least 6% by weight of a concentrated aqueous sugar solution used as a binder and at least 1% by weight of the animal vegetable feeding fat, making a total of at least 7% by weight of liquid ingredients.

A particularly preferred mixture for use in the process of the invention contains at least the following ingredients in the following relative amounts used for the effects stated below:

| INGREDIENT | EFFECT | % BY WEIGHT | |
|---|---|---|---|
| Sodium bicarbonate and/or sodium sesquicarbonate | Buffer | at least 60 | |
| Magnesium oxide | Buffer | at least 20 | |
| Dry molasses | Binder | 2 to 8 | } Maximum 16 |
| Liquid molasses | Binder | 4 to 10 | |
| Lignosulfonate | Binder | 2 to 4 | |
| Animal vegetable feeding fat | Water proofing effect | 1 to 2 | |
| Vitamin premix | Nutritional effect | up to 0.1 | |

The mixture used in the present invention may optionally contain additional ingredients, as required. Preferred additional ingredients and possible substitutes therefor are shown below:

| OPTIONAL INGREDIENT | SUBSTITUTE MATERIAL | % BY WEIGHT |
|---|---|---|
| Wheat middlings | Ground corn | 0-10 |
| Calcium carbonate | Any other mineral | 0-5 |
| Magnesium sulfate | Any other mineral | 0-5 |
| Potassium sulfate | Any other mineral | 0-5 |
| Flavor (e.g. vanilla flavor) | — | 0-0.10 |
| Iron oxide | any other mineral | 0-0.20 |

A particularly preferred composition for use in the present invention is the following:

| INGREDIENT | APPROXIMATE AMOUNT IN % BY WEIGHT | |
|---|---|---|
| Wheat middlings | 5 | |
| Animal vegetable feeding fat | 1 | |
| Liquid molasses | 4-10 | } Total 16% Maximum |
| Dry molasses | 2-8 | |
| Calcium carbonate | 0.15 | |
| Sodium bicarbonate | 1-59 | } Total 60% Minimum |
| Sodium sesquicarbonate | 59-1 | |
| Magnesium oxide | 20 | |
| Magnesium sulfate + potassium sulfate | 1.5 | |
| Iron oxide | 0.20 | |
| Flavor | 0.05 | |
| Lignosulfonate | 2 | |
| Vitamin Premix | 0.10 | |
| TOTAL | 100 | |

The ingredients of the buffer block are thoroughly mixed together without added water or other solvent in a suitable mixer, e.g. a twin shaft paddle mixer and in a double ribbon mixer, to form an homogenous mixture. This procedure is usually carried out by first mixing the solids over a period of about 2-3 minutes, and then mixing in the "liquids" (sugar solution and animal vegetable feeding fat) over a further period of about 2 minutes. Incidentally, the fat, if solid at ambient temperatures, is generally heated to make it liquid before use in the method of the present invention and may be stored in heated vats to make it available for immediate use.

The resulting mixture is then subjected to a conditioning step in which it is agitated, e.g. in a double ribbon mixer, at ambient temperature for a period of about 15-20 minutes, during which time the liquid ingredients humidify the mixture (i.e. the liquid components permeate the mixture) and reaction commences between the sugars of the binder and the magnesium oxide or other minerals. During this conditioning step, the temperature of the mixture rises from ambient to about 110°-120° F. (43°-49° C.) without application of external heat. The temperature rise is believed to be due to the effect of exothermic reactions taking place within the mixture and partly possibly due to internal friction caused by the mixing procedure.

The mixture is then shaped and compressed in a suitable press, such as an hydraulic block press, which also increases the temperature of the mixture, possibly due to internal friction. The pressure which is required for this step is at least about 2800 lb/sq.inch (19,306 kPa) and the mixture should be subjected to this pressure for a period of at least about 8 seconds, and normally 10 to 12 seconds. Higher 15 pressures may reduce treatment times to some extent, but the compression step should be of sufficient duration to form a block of adequate hardness, and 8 seconds is usually the minimum time required for this. Shorter periods could of course be employed if adequate results were thereby obtained.

The heating which the mixture undergoes in the conditioning step and the pressing step imparts a "chocolate" smell and flavor to the block, probably as a result of caramelization of the sugars, which improves palatability.

After the compression step, the block may be packaged in a suitable wrapper or container and then the packaged product is preferably allowed to stand at ambient temperatures for a period of 1 to 2 weeks to allow further maturation, during which time the block hardens further and stabilizes.

At the end of this time, the product can be shipped to the users through normal commercial channels.

The resulting buffer block has a density of about 85–95 lb/cu.ft. (1,362–1,522 kg/m$^3$) and is sufficiently soluble to be dissolved when the animals lick the block, but not so soluble that rapid dissolution takes place when the block is exposed to rain. Under laboratory conditions, the rate of dissolution of the block is about 5.25 lb/hr (2.38 kg/hr) under a continual jet of water flowing at 0.85 US gal/minute (3.2 liter/minute) at 63° F. (17° C). Even when the block is saturated and the surface starts to dissolve, under a thin soft layer, the block remains hard.

The invention is further illustrated by the following Example but should not be construed as limited thereto.

EXAMPLE

Tests were carried out using blocks having the following composition produced according to the preferred method indicated above:

| INGREDIENT | PERCENT BY WEIGHT |
| --- | --- |
| Wheat middlings | 5 |
| Animal vegetable feeding fat | 1 |
| Liquid molasses | 6 |
| Dry molasses | 4 |
| Calcium carbonate | 0.15 |
| Sodium bicarbonate | 59 |
| Sodium sesquicarbonate | 1 |
| Magnesium oxide | 20 |
| Magnesium sulfate + potassium sulfate | 1.5 |
| Iron oxide | 0.20 |
| Flavor (vanilla) | 0.05 |
| Lignosulfonate | 2 |
| Vitamin premix | 0.1 |
| TOTAL | 100 |

The blocks were offered to dairy cows which consumed the blocks on a free choice basis in sufficient amounts to properly regulate rumen pH and to avoid the negative effects of high energy, low fiber diets.

While preferred embodiments of the invention are described in detail above, it will be realized by persons skilled in the art that modifications and improvements may be made without departing from the spirit and scope of the invention.

What we claim is:

1. A process of producing a buffer block for ruminant animals, which comprises forming a mixture containing at least about 60% by weight of at least one solid buffer material other than magnesium oxide, at least about 20% by weight of magnesium oxide, and no more than about 16% by weight of a sugar-containing binder, and shaping and compressing the mixture at a pressure of at least about 2800 pounds per square inch for at least about 8 seconds to form a solid block.

2. A process according to claim 1 wherein the sugar-containing binder is molasses.

3. A process according to claim 2 wherein the molasses is a combination of liquid and dry molasses.

4. A process according to claim 1 wherein said at least one solid buffer material other than magnesium oxide is selected from the group consisting of sodium bicarbonate, sodium sesquicarbonate and mixtures thereof.

5. A process according to claim 1 further including lignosulfonate as an additional binder.

6. A process according to claim 1 wherein the mixture contains:

| INGREDIENT | EFFECT | % BY WEIGHT | |
| --- | --- | --- | --- |
| Sodium bicarbonate and/or sodium sesquicarbonate | Buffer | at least 60 | |
| Magnesium oxide | Buffer | at least 20 | |
| Dry molasses | Binder | 2 to 8 | } Maximum 16 |
| Liquid molasses | Binder | 4 to 10 | |
| Lignosulfonate | Binder | 2 to 4 | |
| Animal vegetable feeding fat | Water proofing effect | 1 to 2 | |
| Vitamin premix | Nutritional effect | up to 0.1. | |

7. A process according to claim 6 wherein the mixture additionally contains:

| INGREDIENT | % BY WEIGHT |
| --- | --- |
| Wheat middlings | 0–10 |
| Calcium carbonate | 0–5 |
| Magnesium sulfate | 0–5 |
| Potassium sulfate | 0–5 |
| Flavor | 0–0.10 |
| Iron oxide | 0–0.20. |

8. A process according to claim 1 wherein the mixture comprises:

| INGREDIENT | APPROXIMATE AMOUNT IN % BY WEIGHT | |
| --- | --- | --- |
| Wheat middlings | 5 | |
| Animal vegetable feeding fat | 1 | |
| Liquid molasses | 4–10 | } Total 16% Maximum |
| Dry molasses | 2–8 | |

-continued

| INGREDIENT | APPROXIMATE AMOUNT IN % BY WEIGHT | |
|---|---|---|
| Calcium carbonate | 0.15 | |
| Sodium bicarbonate | 1-59 | Total 60% Minimum |
| Sodium sesquicarbonate | 59-1 | |
| Magnesium oxide | 20 | |
| Magnesium sulfate + potassium sulfate | 1.5 | |
| Iron oxide | 0.20 | |
| Flavor | 0.05 | |
| Lignosulfonate | 2 | |
| Vitamin Premix | 0.10 | |
| TOTAL | 100. | |

9. A process according to claim 1 wherein the mixture is formed without the separate addition of water.

10. A process according to claim 1 wherein said mixture is formed by first mixing together solid ingredients of said mixture and them mixing liquid ingredients of said mixture with said solid ingredients.

11. A process according to claim 10 wherein the mixture is agitated for a period of time following the addition of said liquid ingredients in order to permit said liquid ingredients to humidify said solid ingredients prior to shaping and compressing said mixture.

12. A process according to claim 11 wherein said period of time is about 15 to 20 minutes.

13. A process according to claim 1 wherein the solid block is allowed to stand prior to use for a period of time following shaping and compressing said mixture in order to permit further hardening of the block.

14. A process according to claim 13 wherein said period of time is within the range of 1 to 2 weeks.

15. A solid buffer block for ruminant animals comprising a compressed mixture containing at least about 60% by weight of at least one solid buffer material other than magnesium oxide, at least about 20% by weight of magnesium oxide, and no more than about 16% by weight of a sugar-containing binder.

16. A buffer block according to claim 15 wherein said sugar-containing binder is molasses.

17. A buffer block according to claim 16 wherein said molasses is a combination of liquid molasses and dry molasses.

18. A buffer block according to claim 15 having been formed by subjecting said mixture to a pressure of at least 2800 pounds per square inch for a period of at least 8 seconds to compress said mixture.

19. A buffer block according to claim 15 wherein the solid buffer material other than magnesium oxide is selected from the group consisting of sodium bicarbonate, sodium sesquicarbonate and mixtures thereof.

20. A buffer block according to claim 15 containing:

| INGREDIENT | EFFECT | % BY WEIGHT | |
|---|---|---|---|
| Sodium bicarbonate and/or sodium sesquicarbonate | Buffer | at least 60 | |
| Magnesium oxide | Buffer | at least 20 | |
| Dry molasses | Binder | 2 to 8 | Maximum 16 |
| Liquid molasses | Binder | 4 to 10 | |
| Lignosulfonate | Binder | 2 to 4 | |
| Animal vegetable feeding fat | Water proofing effect | 1 to 2 | |
| Vitamin premix | Nutritional effect | up to 0.1. | |

21. A buffer block according to claim 20 further containing:

| INGREDIENT | % BY WEIGHT |
|---|---|
| Wheat middlings | 0-10 |
| Calcium carbonate | 0-5 |
| Magnesium sulfate | 0-5 |
| Potassium sulfate | 0-5 |
| Flavor | 0-0.10 |
| Iron oxide | 0-0.20. |

22. A buffer block according to claim 15 containing:

| INGREDIENT | AMOUNT IN % BY WEIGHT | |
|---|---|---|
| Wheat middlings | 5 | |
| Animal vegetable feeding fat | 1 | |
| Liquid molasses | 4-10 | Total 16% Maximum |
| Dry molasses | 2-8 | |
| Calcium carbonate | 0.15 | |
| Sodium bicarbonate | 1-59 | Total 60% Minimum |
| Sodium sesquicarbonate | 59-1 | |
| Magnesium oxide | 20 | |
| Magnesium sulfate + potassium sulfate | 1.5 | |
| Iron oxide | 0.20 | |
| Flavor | 0.05 | |
| Lignosulfonate | 2 | |
| Vitamin Premix | 0.10 | |
| TOTAL | 100. | |

* * * * *